United States Patent [19]
Zarrow

[11] Patent Number: 5,991,813
[45] Date of Patent: Nov. 23, 1999

[54] NETWORK ENABLED SCSI INTERFACE

[75] Inventor: Robert Zarrow, Warren, N.J.

[73] Assignee: ICon CMT Corp., Weehawken, N.J.

[21] Appl. No.: 08/857,781

[22] Filed: May 16, 1997

[51] Int. Cl.$^6$ .................................................. G06F 15/16
[52] U.S. Cl. ........................ 709/236; 709/103; 709/238
[58] Field of Search .................................... 395/825, 800, 395/844, 200.66, 200.76, 200.8, 182.04, 826; 364/238–239; 709/103, 236, 246, 250; 714/6; 710/5, 6

[56] References Cited

U.S. PATENT DOCUMENTS

| | | | |
|---|---|---|---|
| 5,335,352 | 8/1994 | Yanni et al. | 710/51 |
| 5,432,932 | 7/1995 | Chen et al. | 709/4 |
| 5,491,812 | 2/1996 | Pisello et al. | 709/236 |
| 5,544,347 | 8/1996 | Yanni et al. | 714/6 |
| 5,598,538 | 1/1997 | Cooper | 710/101 |
| 5,838,950 | 11/1998 | Young et al. | 710/5 |

FOREIGN PATENT DOCUMENTS 0 752 646  1/1997  European Pat. Off. .

OTHER PUBLICATIONS

PCT International Search Report of International Application No. PCT/US98/09920.

"Small Computer System Interface—3 Generic Packetized Protocol (SCSI–GPP)," draft proposed X3 Technical Report, Published by American National Standards Institute, *SCSI–3 GPP REV 9*, Jan. 12, 1995, pp. 1–161.

*Primary Examiner*—Glenton B. Burgess
*Assistant Examiner*—William Titcomb
*Attorney, Agent, or Firm*—Marshall, O'Toole, Gerstein, Murray & Borun

[57] ABSTRACT

A method of communication between a local computer and an SCSI device attached to a remote computer includes receiving a command relating to a file at the remote SCSI device. The local computer creates an SCSI command which is packetized at the local computer and transferred over a network to the remote computer. The remote computer unpacks the command and sends it to the host bus adaptor driver and host bus adaptor controller for the remote device. The remote device then executes the command. Remote SCSI communication is particularly useful in mirroring applications where a complete copy of data is stored at the local location and at the remote location.

10 Claims, 3 Drawing Sheets

NETWORK ENABLED SCSI INTERFACE

FIELD OF THE INVENTION

The present invention relates generally to communication with Small Computer Systems Interface (SCSI) devices and more particularly to communication with SCSI devices over networks.

BACKGROUND OF THE INVENTION

Computers are often connected to various peripheral devices such as scanners, hard disk drives, CD ROM players, tape drives, etc. Communication between the computer and these devices generally follows one of the SCSI standards, which have become the predominant protocols for communication with peripherals for computer systems of all sizes.

A significant drawback of communications using the first two SCSI standards, SCSI-1 and SCSI-2, is that communication is limited to relatively short distances. SCSI devices usually use 50 or 68 pin cables which generally must be less than 25 meters in length. Thus, placing an SCSI device on a network or use of such a device by more than one computer in a network has been difficult. In order to overcome the distance limitation, a third set of standards, SCSI-3, has been developed, which includes three serial network SCSI standards. The three standards include serial storage architecture (SSA), which is generally a local area network (LAN) based standard and has a low bandwidth. Fiber Channel is another SCSI network standard, has a high bandwidth, and is designed for campus-based communications of about 2 kilometers. The third standard is the Generalized Packet Protocol (GPP), which is designed for use over wide-area networks. GPP allows the packetization of SCSI commands and data to permit communication over long distances, such as or found in wide area networks, like the Internet.

In order to use the GPP protocol, it is desirable to develop interfaces with present computer systems and software in order to efficiently access SCSI devices over networks. Preferably, remote SCSI devices should be accessed by an application at a local computer in a manner similar to accessing local SCSI devices. For instance, it is desirable for applications, which take advantage of mirroring of databases on SCSI devices, to utilize remote devices. Mirroring is used to make two or more copies of data on separate storage devices, so that if one device fails, the data will be present on a second device. However, if both devices are at the same location, the system is vulnerable to catastrophic failures such as power outages, floods, or fires in which both storage devices could be harmed or destroyed. Similarly, if the computer attached to those devices fails, access to the information on the storage devices can be temporarily or permanently impaired. It is therefore desirable to utilize remote storage devices, but in a system in which the remote access is transparent to the applications utilizing files on SCSI devices.

SUMMARY OF THE INVENTION

In accordance with a first aspect of the present invention, a method of communicating with an SCSI device over a network includes receiving a command at a first computer relating to a file on an SCSI device at a second computer. The command is converted into an SCSI command, which is then packetized and transferred over the network to the second computer. The SCSI command is unpacketized at the second computer, and then transferred to the SCSI device.

Prior to receiving the command, the first computer and second computer may establish communication. Such communication may be established by daemons on the first computer and on the second computer. The first computer and second computer may each include a read daemon and a write daemon. A target driver may transfer the SCSI command to an a Sun Common SCSI Architecture (SCSA) interface at the first computer and the location of the file relating to the SCSI command may be determined.

The command received by the first computer may be a mirroring command, which is converted into a first SCSI command and a second SCSI command. The first SCSI command is executed at the first computer, and the second SCSI command is the SCSI command that is packetized and transferred over the network to the computer.

In accordance with another aspect of the present invention, one or more apparatus may be provided, and one or more computer-readable memory storage devices may contain instructions for performing the method of communicating with an SCSI device over a network.

In accordance with another aspect of the present invention, a method of communicating with an SCSI device over a network includes establishing communication between a first computer and a second computer, and thereafter receiving a command at the first computer relating to a file on an SCSI device at the second computer. The command is converted to an SCSI command, which is packetized and transferred over the network to the second computer. The second computer unpacketizes the SCSI command and transfers that command to the SCSI device.

Other features and advantages are inherent in the method and apparatus claimed and disclosed, or will be apparent to those skilled in the art from the following detailed description in conjunction with the accompanying drawings.

DETAILED DESCRIPTION OF THE PREFERRED EMBODIMENT

Figure 1:
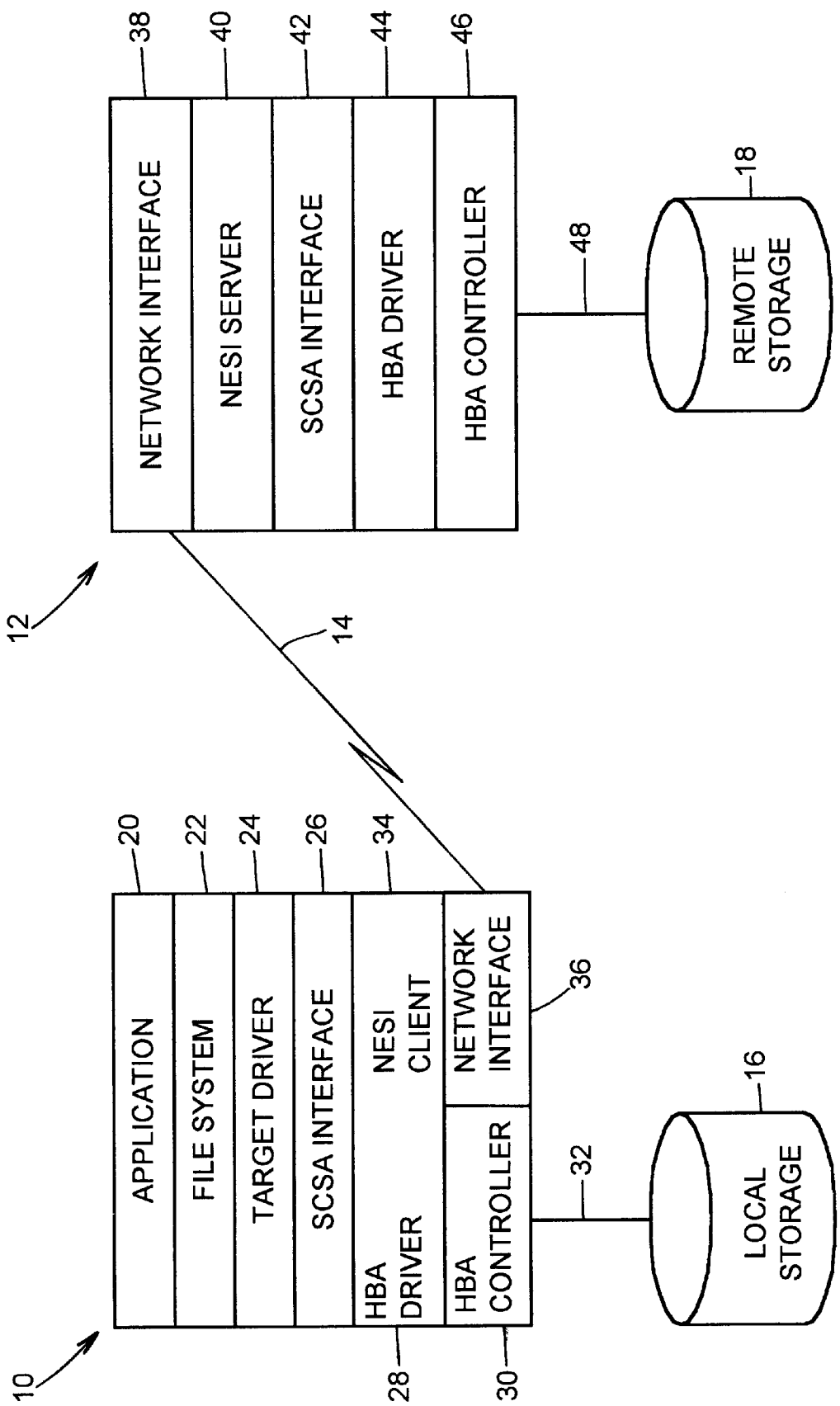
FIG. 1 is block diagram of two computers connected over a computer network for performing the method of the present invention.

FIG. 1 graphically depicts the hardware/software used in wide-area network communication with SCSI devices in accordance with the present invention. The system includes a local computer indicated generally at 10, and a remote computer indicated generally at 12, connected over a network 14. The local computer 10 is attached to a local storage device 16, such as a disk drive or tape device. Similarly, the remote computer 12 is attached to a remote storage device 18. Local storage device 16 and remote storage device 18 may be conventional peripheral devices communicating with their respective computers under SCSI protocols. Although only a single storage device is shown for each of computers 10 and 12, numerous devices may be attached to each. Many types of computers can be used as the local computer 10 and the remote computer 12, but preferably a Sun Sparc computer with a Solaris 2.5.1 operating system.

The local computer 10 includes an application layer 20, which will generally consist of various programs for the computer to execute. An almost unlimited variety of applications are usable with the present invention, if they require access to information which could be stored on an SCSI device remote from the computer running the application. The local computer 10 also includes a file system 22 which contains programs, data, and lists of other files and data outside the computer.

The local computer 10 contains a target driver 24 which is generally part of the computer's operating system. The target driver formats SCSI commands to include addresses of the target file, the operation to be performed, and any pertinent data. Where the local computer 10 has a Solaris operating system, such as may be used on a Sun Sparc computer, the operating system will also include a SUN Common SCSI Architecture (SCSA) interface 26. The local computer 10 also includes a host-bus adaptor (HBA) driver 28 which transports that command onto an SCSI bus to an HBA controller 30. The SCSA interface 26 controls the separation of the formatting function performed by the target driver 24 and the transporting function performed by the HBA driver 28. Once the HBA driver 28 has transported the command to an SCSI bus, the HBA controller 30 then passes the signal over an SCSI cable 30 to the local storage device 16 for execution of the command.

As discussed in more detail below, when the SCSA interface 26 determines that a file is not located on a local storage device but is instead at a remote location, the Network-Enabled SCSI Interface (NESI) client 34 receives the command. On the local computer 10, the NESI client 34 appears like an HBA driver to the target driver 24. The NESI client 34 then communicates with the computer's network interface 36 in order to transmit commands, messages, and data over the network 14 to the remote computer 12.

The remote computer 12 has a network interface 38 similar to network interface 36 for sending and receiving messages. The network interface 38 then transmits communications relating to SCSI commands to an NESI server 40, which formats those messages and transfers them to the SCSA interface 42 of the remote computer 12. Although not depicted, the remote computer 12 will also have applications, file systems, and target driver layers similar to those for the local computer 10. The NESI server 40 appears just like a target driver to the SCSA interface 42 and initiates SCSI commands just like a target driver. The remote computer 12 has an HBA driver 44 and an HBA controller 46, which operate like the HBA driver 28 and HBA controller 30 respectively of the local computer 10. The HBA controller 46 passes commands over an SCSI cable 48 to the remote storage device 18.

Figure 2:
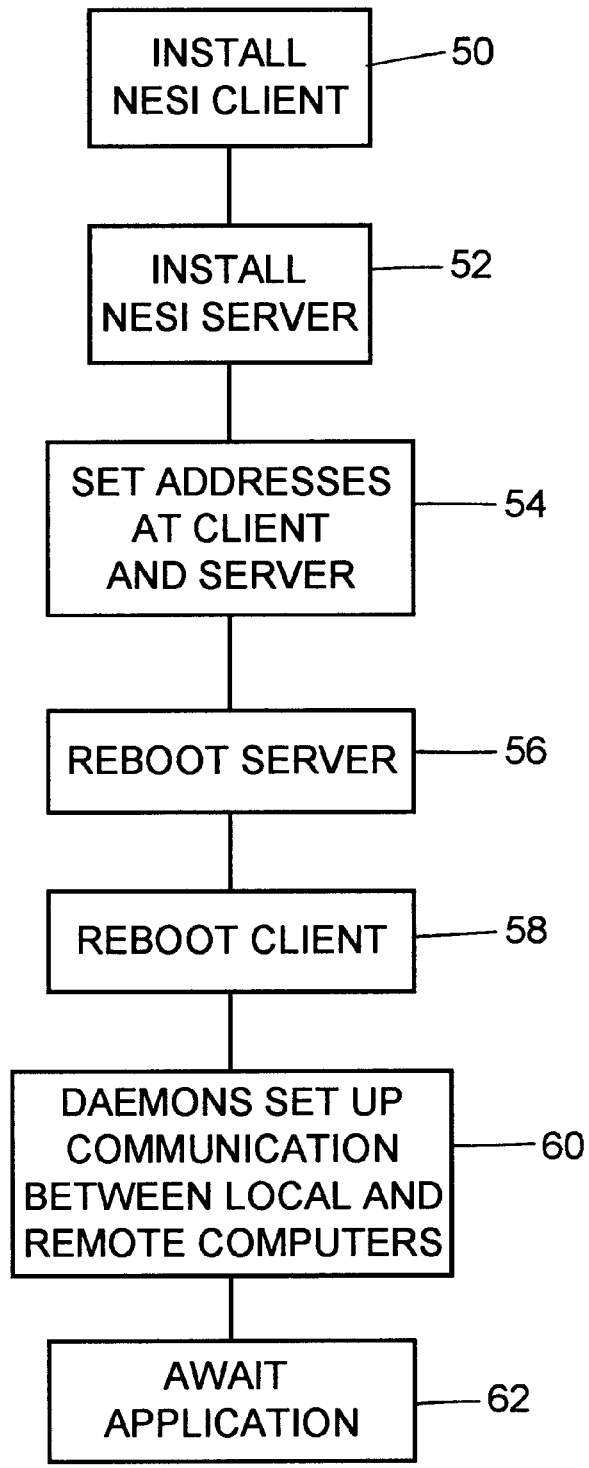
FIG. 2 is a flowchart of the method for establishing communication between two computers in order to utilize remote SCSI devices.

FIG. 2 depicts the steps in preparing the local computer 10 and remote computer 12 for network SCSI communications. At block 50, the NESI client software 34 is installed on the local computer 10. At block 52, the NESI server software 40 is installed at the remote computer 12. At block 54, addresses are set for the NESI client 34 and the NESI server 40 software at the local computer 10 and remote computer 12 respectively. The local computer 10 must have address information for files at the remote storage device 18. When a file is located on local storage, such an address is normally related to the SCSI bus on which the local storage device is placed. When the file is remote, the local computer 10 must correspond that file to an outside address such as a Transmission Control Protocol (TCP) internet address. Similarly, the remote computer 12 must have the address of the local computer 10 in order to return information relating to a command, such as data when it is a read command, or simply confirmation that a command has been executed.

Once addresses have been set, the server or remote computer 12 is rebooted at block 56. Subsequently, the client or local computer 10 is rebooted at block 58. Once the computers have been rebooted, daemons set up communication between the local 10 and remote 12 computer. The daemons are installed with the NESI client 34 and NESI server 40 software and run continuously with the operating system of each computer. The daemons set up communication by using the relevant addresses, initiating a handshaking protocol and starting communication. By setting up communication between the local 10 and remote 12 computers, an open channel between them is created, with each computer having a read daemon and a write daemon running continuously. In such a situation, each computer is always prepared to receive a communication from the other. Once a communication channel has been set up, control passes to block 62 where each computer awaits an application requiring communication. Depending on the applications anticipated, it may be desirable to set up communication between a local computer 10 and two or more remote computers 12.

It is desirable for an open channel to be set up between the computers prior to the generation of any command requiring communication, in order to decrease the time it takes to send messages between the computers. It is possible to set up communication between computers only when a message is being sent; however, it takes time to establish communication, resulting in longer times to transmit, execute, and report the results of a command. That additional time may not only slow down the operation, but may also cause it to fail. Applications on local computers 10 generally assume that a command relating to an SCSI device will be executed in a limited amount of time. If the application has not received confirmation within that limited time, it assumes that the operation failed and may resend the command. Thus, to avoid modifying the applications and to execute remote SCSI commands as transparently to those applications as possible, it is desirable to set up communication using daemons, prior to the need to execute a remote SCSI command.

Figure 3:
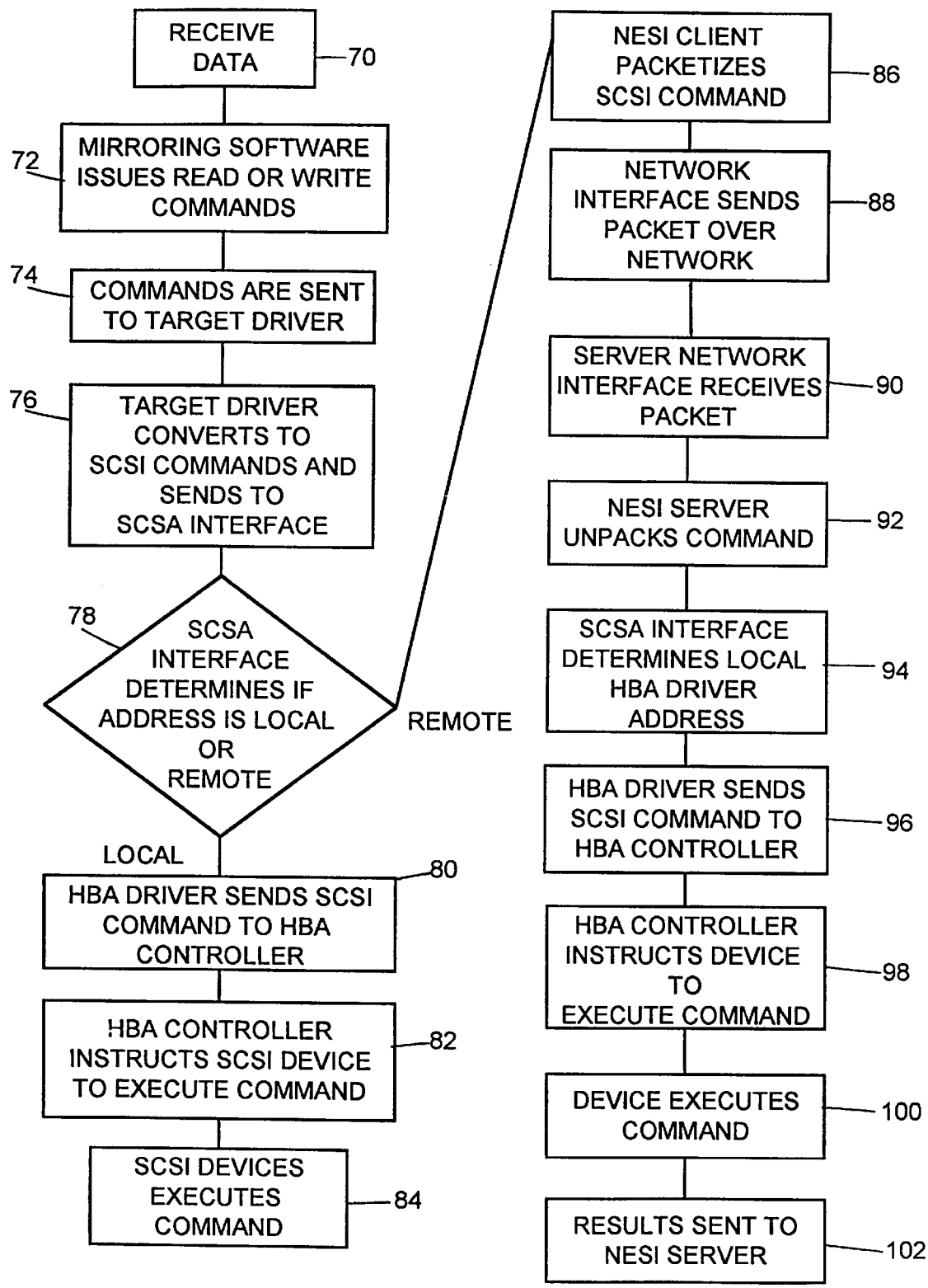
FIG. 3 is a flowchart of a method for a local computer to communicate with local and remote SCSI devices.

FIG. 3 depicts a method of utilizing the present invention where mirroring software copies data to a local SCSI storage device 16 and a remote SCSI storage device 18. At block 70, the system 10 receives data which needs to be copied to two or more files, one of which is located on a remote SCSI device 18. The data could be received from a variety of internal or external sources in accordance with the application controlling the local computer 10. In receiving the data, the application 20 is creating a command for that data to be stored by the computer 10. At block 72, the command received at block 70 is converted into either one or more write commands or one read command if mirroring is desired. A variety of system utilities including SUN'S Solstice DiskSuite and Veritas Volume Manager include mirroring software. Mirroring software generally works by having a metadisk to which applications read or write. A metadisk represents two or more physical storage locations, each of which is generally intended to be a copy of the other. When the mirroring software receives a read or write command to the metadisk, it will either create a read command or create two or more write commands to each of the actual storage locations.

At block 74, the read or write commands are sent to the local computer's target driver 24. At block 76, the target driver 24 converts the read or write commands to SCSI commands and sends the SCSI commands to the SCSA interface 26 of the local computer 10. At block 78, the SCSA interface 26 reads the addresses from the commands and determines whether a command relates to a local or remote address. Where the address is local, the computer 10 handles the command as it would any other local SCSI command and control passes to block 80 where an HBA driver 28 sends the local SCSI command to an HBA controller 30. At block 82, the HBA controller 30 instructs the SCSI device to execute the command which is executed at block 84 by a device, such as the local storage device 16 shown in FIG. 1. The SCSI device may report execution of the command, or if the command was a read command, would transmit data back to the local computer 10.

If, at block 78, the address is a remote address, the SCSA interface 26 sends the command to the NESI client 34 on the local computer 10, which appears to the SCSA interface as another HBA driver. At block 86, the NESI client 34 packetizes the SCSI command using, for instance, the GPP standard in SCSI-3. Control then passes to block 88 where the network interface 36 of the local computer 10 sends the packet over the network 14 which is received at block 90 by the network interface 38 of the remote computer 12.

At block 90, the NESI server 40 at the remote computer 12 unpacks the packetized command and converts it into an ordinary SCSI command. At block 94, the SCSI command is then reviewed by the SCSA interface 42 to determine the local HBA driver 44 address for executing that command. When the NESI server 40 transfers the command to the SCSA interface 42, the NESI server 40 appears as a target driver to the SCSA interface 42.

At block 96, the HBA driver 44 sends the SCSI command to the HBA controller 46. At block 98, the HBA controller 46 instructs the device to execute the command, which is executed by an SCSI device such as remote storage device 18 (FIG. 1) at block 100.

At block 102, results of the command are sent to the NESI server 40. At that point, the NESI server 40 operates in a fashion similar to the NESI client 34 in the local computer 10. The SCSI device 18 transmits the results of the operation in SCSI format, which is packetized by the NESI server 40 and sent over the network 14 back to the local computer 10. At the local computer 10, the packetized results are unpacketized and reviewed by the local computer 10 to determine whether the command was executed properly. If it was properly executed, the information is then transmitted back to the application 20, which originally created the command to be executed.

Although FIG. 3 primarily depicts the operation of remote SCSI communication in which mirroring software writes to a remote location, other uses may be made of the present invention. For instance, if an application needs to read from a metadisk, and the local disk has failed or is unavailable, the information can be read by sending a command to the remote computer 12 and remote storage 18 to obtain that information.

Although the ability to communicate with remote SCSI devices 18 is particularly valuable in mirroring, it may also be used for other non-mirroring applications. For instance, a local computer 10 may simply need to access information at a remote location. With a system of the present invention, such access is available by simply creating an SCSI command at the local location 10, packetizing that SCSI command, and transferring it over the network to the remote computer 12.

Generally, mirroring software has a fail-over system which detects the failure or unavailability of one of the storage devices and routes all read and write commands to the other location. Where the other location is at a remote computer 12, it may be necessary for the remote computer 12 to advertise over the network 14 that read or write requests to a particular metafile should be sent to that remote computer 12. Such advertisement by the remote computer 12 is particularly important where the failure is not of the local storage device 16 but of the local computer 10. By advertising from the remote computer 12, a network which utilizes a database can operate almost uninterrupted even when the local computer 10 fails. Advertising can be initiated automatically when the remote computer 12 detects the absence of a heartbeat daemon from the local computer 10. The advertisement can also be accomplished manually based on an alarm at the remote computer 12. Mirroring software also generally has a fail-back system which writes over the failed disk with information from the secondary or backup disk. The remote SCSI communication can also be used for such fail-back applications.

The method of the present invention can be performed by one or more apparatus such as local computer 10 and remote computer 12. The instructions for performing those functions may be stored in the file systems of those computers or on a disk or other computer-readable storage device.

The foregoing detailed description has been given for clearness of understanding only, and no unnecessary limitations should be understood therefrom, as modifications would be obvious to those skilled in the art.

I claim:

1. A method of communicating with an SCSI device over a network, the method comprising:

setting an address at a first computer relating to a file on the SCSI device at a second computer;

receiving a command at the first computer;

reading an address associated with the command;

converting the command to an SCSI command;

determining whether the command relates to the address;

packetizing the SCSI command and transferring the SCSI command over the network to the second computer if the command relates to the address;

unpacketizing the SCSI command at the second computer; and transferring the SCSI command at the second computer to the SCSI device.

2. The method of claim 1 wherein prior to receiving the command, the first computer and second computer establish communication.

3. The method of claim 2 wherein communication is established by a daemon on the first computer and a daemon on the second computer.

4. The method of claim 3 wherein:

the first computer includes a read daemon and a write daemon; and the second computer includes a read daemon and a write daemon.

5. The method of claim 1 wherein:

the command is a mirroring command;

the mirroring command is converted into a first SCSI command and a second SCSI command;

the first SCSI command is executed at the first computer; and the second SCSI command is the SCSI command that is packetized and transferred over the network to the second computer.

6. One or more apparatus for performing the method of claim 1.

7. One or more computer readable memory storage devices containing instructions for performing the method of claim 1.

8. The method of claim 1 comprising:

transferring the SCSI command to an SCSA interface at the first computer; and determining the location of the file relating to the SCSI command.

9. The method of claim 8 wherein an SCSI command is transferred to the SCSA interface from a target driver.

10. A method of communicating with a first SCSI device at a first computer and a second SCSI device at a second computer over a network, the method comprising:

receiving a mirroring command at the first computer relating to a file on the first SCSI device and the second SCSI device;

converting the mirroring command to a first SCSI command and a second SCSI command at the first computer;

packetizing the second SCSI command at the first computer;

transferring the second SCSI command over the network from the first computer to the second computer;

unpacketizing the second SCSI command at the second computer;

transferring the first SCSI command at the first computer to the first SCSI device; and transferring the second SCSI command at the second computer to the second SCSI device.

* * * * *